United States Patent
Wang et al.

(10) Patent No.: US 9,983,080 B2
(45) Date of Patent: May 29, 2018

(54) HIGH-TEMPERATURE GAS PRESSURE MEASURING METHOD

(71) Applicant: NATIONAL CHUNG SHAN INSTITUTE OF SCIENCE AND TECHNOLOGY, Taoyuan (TW)

(72) Inventors: Yih-Hsing Wang, Taoyuan (TW); Wen-Chueh Pan, Taoyuan (TW); Ming-June Lin, Taoyuan (TW); Jen-Chieh Li, Taoyuan (TW); Tien-Fu Wu, Taoyuan (TW); Tsan-Tung Chen, Taoyuan (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 302 days.

(21) Appl. No.: 14/955,073

(22) Filed: Dec. 1, 2015

(65) Prior Publication Data

US 2017/0153160 A1  Jun. 1, 2017

(51) Int. Cl.
*G01L 11/00* (2006.01)
*G01L 27/00* (2006.01)

(52) U.S. Cl.
CPC .......... *G01L 11/006* (2013.01); *G01L 27/002* (2013.01)

(58) Field of Classification Search
CPC .............................. G01L 11/006; G01L 27/002
See application file for complete search history.

(56) References Cited

U.S. PATENT DOCUMENTS

| | | | |
|---|---|---|---|
| 8,701,496 B1* | 4/2014 | Brown | G01L 7/08 257/419 |
| 8,997,548 B2* | 4/2015 | Ferran | G01L 27/002 73/1.58 |
| 2004/0089073 A1 | 5/2004 | Benzel et al. | |
| 2014/0216127 A1* | 8/2014 | Kimura | G01L 9/04 73/1.57 |

* cited by examiner

*Primary Examiner* — Clayton E Laballe
*Assistant Examiner* — Dennis Hancock
(74) *Attorney, Agent, or Firm* — Schmeiser, Olsen & Watts, LLP

(57) ABSTRACT

A high-temperature gas pressure measuring method includes a pressure measuring gas housing dividing step for dividing a pressure measuring gas housing into a pressure measuring room and a pressure referring room by a metal diaphragm; a gas introducing step for introducing high temperature gas into the pressure measuring room and introducing a reference pressure gas into the pressure referring room; a displacement measuring step for measuring a displacement of the metal diaphragm, wherein the displacement is caused by pressure difference between the two rooms in pressure measuring gas housing; and a pressure determining step for measuring the pressure of a high-temperature and/or corrosive to-measure pressure gas. The method dispenses with any corrosion-resistant and heat-resistant pressure sensing component and thus cuts costs.

9 Claims, 2 Drawing Sheets

HIGH-TEMPERATURE GAS PRESSURE MEASURING METHOD

FIELD OF TECHNOLOGY

Figure 1:
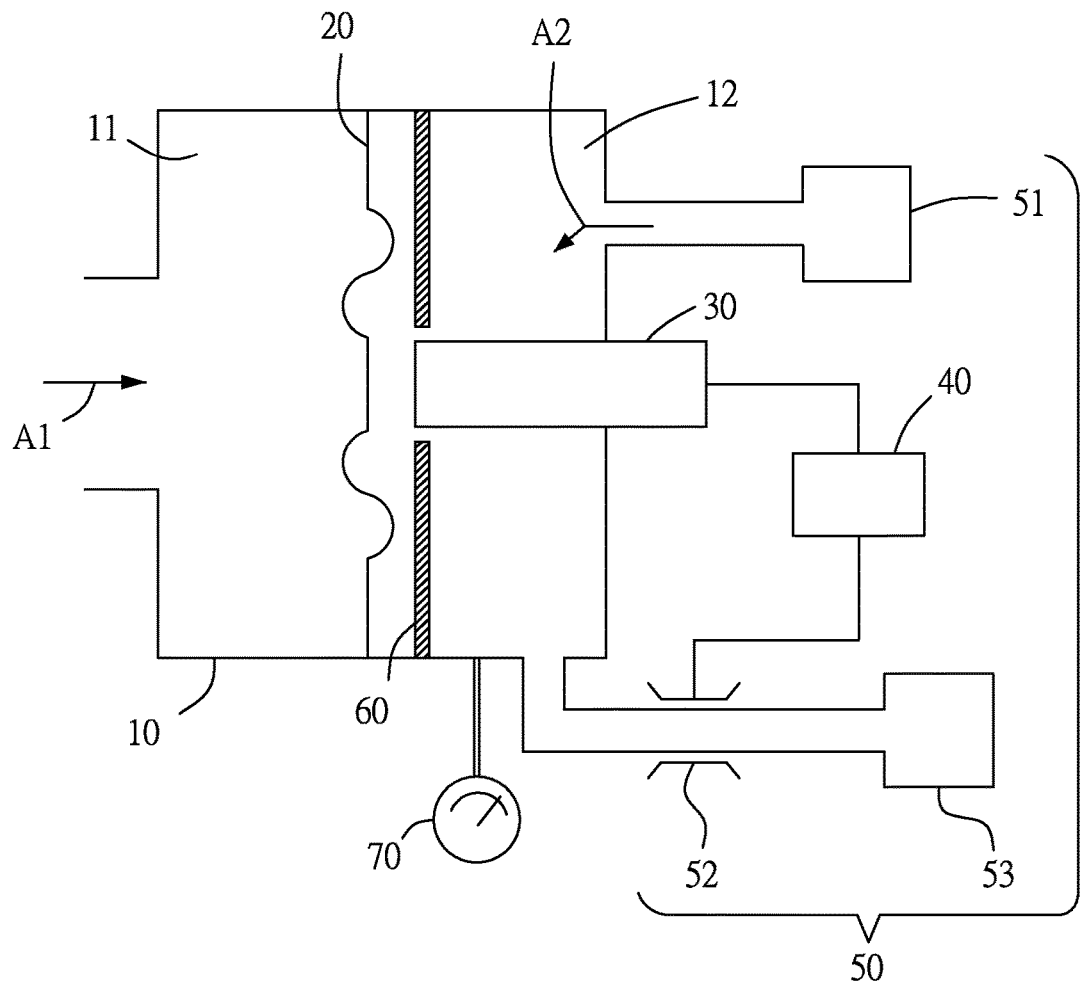

The present invention relates to gas pressure measuring methods and more particularly to a high-temperature gas pressure measuring method.

BACKGROUND

Conventional processes often take place in a high-temperature chamber which contains a corrosive gas. For instance, a Cu/In/Ga/Se solar cell selenization process has to measure the gas pressure in the chamber to control the process and ensure stable product quality. In general, for a low-vacuum CIGS selenization process, the processing gas pressure ranges from medium vacuum to rough vacuum, i.e., 10e-2~760 torr and an operating temperature of 300° C.~680° C.

The operating temperature of a conventional vacuometer or pressure gauge (say US 20040089073) for measuring the chamber gas pressure is limited by the heat resistance characteristics of related elements and the materials which the inner part of the conventional vacuometer or pressure gauge is made of. Furthermore, the pressure gauge for a high-temperature corrosive gas has its sensing components exposed to the high-temperature corrosive gas and thus must be made of a corrosion-resistant and heat-resistant material. In addition, regardless of whether the gas pressure is measured by mechanical or electrical manner, an algorism must be considered for compensating or correcting the issues caused by the constitution of the gas to measure and the operating temperature, not to mention that it has to consider the influences by the thermal expansion of the gas and the thermal sensitivity of the pressure gauge. As a result, the conventional vacuometer or pressure gauge is flawed with imprecise measurement and high costs.

Accordingly, it is imperative to provide a high-temperature pressure measuring method with a view to overcoming the aforesaid drawbacks of the prior art.

SUMMARY

It is an objective of the present invention to provide a high-temperature gas pressure measuring method for high-temperature, even corrosive gas.

In order to achieve the above and other objectives, the present invention provides a high-temperature pressure measuring method. The method comprises a pressure measuring gas housing dividing step, a gas introducing step, a displacement measuring step and a pressure monitoring step. The pressure measuring gas housing dividing step is for dividing a pressure measuring gas housing into a pressure measuring room and a pressure referring room by a metal diaphragm. The gas introducing step is for introducing a to-measure pressure gas into the pressure measuring room and introducing a reference pressure gas into the pressure referring room. The displacement measuring step is for measuring a displacement of the metal diaphragm with a non-contact displacement sensor disposed in the pressure referring room, converting the displacement into a signal, sending the signal, wherein the displacement occurs because of a difference in gas pressure between the pressure measuring room and the pressure referring room. The pressure determining step is for adjusting the gas pressure in the pressure referring room with a gas regulation module, connected to the pressure referring room, and controlled by a controller. The controller regulates gas pressure in the pressure referring room until the displacement of diaphragm is zero or so, it means the gas pressure levels in the two rooms are nearly equal, then measure the gas pressure in the pressure referring room.

In an embodiment of the present invention, the gas regulation module comprises a reference pressure gas supply source, a vacuum pump and a needle valve. The reference pressure gas supply source is for supplying the reference pressure gas to the pressure referring room. The vacuum pump is for providing a back pressure. Two ports of the needle valve are connected to the pressure referring room and the vacuum pump, and the needle value can be adjusted the flow passing through by the controller.

In an embodiment of the present invention, the gas temperature in pressure measuring room is between 350° C. to 680° C.

In an embodiment of the present invention, the reference pressure gas is an inert gas, nitrogen gas, or dry air.

In an embodiment of the present invention, the reference pressure gas is supplied continuously and steadily from an external gas source, that results no gas expansion and contraction issues in pressure measuring room due to temperature variation.

In an embodiment of the present invention, a swirl-reducing baffle for reducing the gas disturbance in the pressure referring room is introduced to avoid influencing the metal diaphragm deforming behavior.

In an embodiment of the present invention, in the pressure determining step, the inaccurate pressure measuring result is compensated by preloading the metal diaphragm temperature-displacement correction datum, eliminating the diaphragm thermal expansion effect, into controller, which control the needle value to tune the flow out of the pressure referring room.

In an embodiment of the present invention, the metal diaphragm is made of a corrosion-resistant, heat-resistant material, thin, and with ripple shape.

In an embodiment of the present invention, the gas in the pressure measuring room can be corrosive.

In an embodiment of the present invention, the diaphragm displacement is detected by a non-contact displacement sensor.

Hence, a high-temperature gas pressure measuring method of the present invention is characterized in that: a displacement of a metal diaphragm which separates two rooms is measured, wherein the displacement is caused by pressure difference between the two rooms; and the pressure of a high-temperature and/or corrosive to-measure pressure gas is measured, thereby dispensing with any corrosion-resistant heat-resistant pressure sensing component and thus cutting costs.

BRIEF DESCRIPTION

Figure 2:
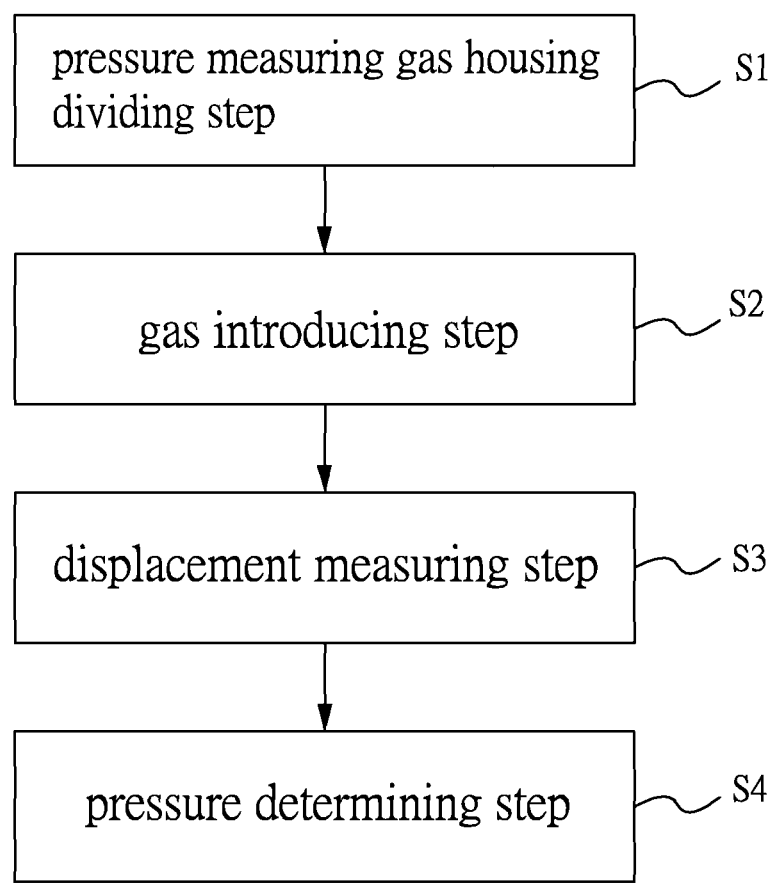

Objectives, features, and advantages of the present invention are hereunder illustrated with specific embodiments in conjunction with the accompanying drawings, in which:

FIG. 1 is a schematic view of a high-temperature gas pressure measuring device according to an embodiment of the present invention; and FIG. 2 is a schematic view of the process flow of a high-temperature gas pressure measuring method according to an embodiment of the present invention.

DETAILED DESCRIPTION

Referring to FIG. 1, there is shown a schematic view of a high-temperature gas pressure measuring device according to an embodiment of the present invention. The high temperature gas pressure measuring device comprises a pressure measuring gas housing 10, a metal diaphragm 20, a non-contact displacement sensor 30, a controller 40 and a gas regulation module 50.

The metal diaphragm 20 is disposed in the pressure measuring gas housing 10 to divide the pressure measuring gas housing 10 into a pressure measuring room 11 and a pressure referring room 12. The metal diaphragm 20 is made of a corrosion-resistant and heat-resistant material as needed. The metal diaphragm 20 is thin and ripple shaped to thereby reduce its thermal stress and deformed which might otherwise occur because of the difference in temperature between the pressure measuring room 11 and the pressure referring room 12 which are separated by the metal diaphragm 20, reduce diaphragm vertical elastic rigidity, and increase the sensitivity of pressure toward displacement. The non-contact displacement sensor 30 is disposed in the pressure referring room 12 and points at the metal diaphragm 20. The non-contact displacement sensor 30 measures the displacement of the metal diaphragm 20. The non-contact displacement sensor 30 reduces the interaction between the metal diaphragm 20 and the displacement sensor 30. The controller 40 is wired to connect the non-contact displacement sensor 30. A gas regulation module 50 connected to the pressure referring room 12 is controlled by the displacement of the metal diaphragm 20, thereby regulating the gas pressure in the pressure referring room 12.

The gas regulation module 50 comprises a reference pressure gas supply source 51, a needle valve 52 and a vacuum pump 53. The reference pressure gas supply source 51 is connected to the pressure referring room 12 to thereby supply a gas, at a stable flow rate, to the pressure referring room 12. The gas is exemplified by an inert gas, nitrogen gas and dry air. The needle valve 52 links the pressure referring room 12 and the vacuum pump 53. The flow passing through the needle valve 52 is regulated by the controller 40. The vacuum pump 53 provides a stable back pressure.

Referring to FIG. 2, there is shown a schematic view of the process flow of a high-temperature gas pressure measuring method according to an embodiment of the present invention. The high-temperature gas pressure measuring method comprises a pressure measuring gas housing dividing step S1, a gas introducing step S2, a displacement measuring step S3 and a pressure determining step S4.

In the pressure measuring gas housing dividing step S1, the metal diaphragm 20 divides the pressure measuring gas housing 10 into the pressure measuring room 11 and the pressure referring room 12.

In the gas introducing step S2, high-temperature gas A1 is introduced into the pressure measuring room 11, and a reference pressure gas A2 is introduced into the pressure referring room 12. The high-temperature gas A1 is gas which, for example, operates at 350° C. through 680° C. in a Cu/In/Ga/Se solar cell selenization process and may be corrosive. The reference pressure gas A2 is supplied by the gas supply source 51.

The metal diaphragm 20 undergoes displacement because of the difference in temperature and pressure between the high-temperature gas A1 in the pressure measuring room 11 and the room-temperature gas A2 in the pressure referring room 12.

In the displacement measuring step S3, the non-contact displacement sensor 30 measures the aforesaid displacement of the metal diaphragm 20, converts the displacement thus measured into an electrical signal, and sends the electrical signal to the controller 40. The metal diaphragm 20 is deformable and thus has enough sensitivity to the displacement due to the pressure difference against the diaphragm 20.

The aforesaid deformation of the metal diaphragm 20 may also be attributed to thermal expansion which arises from the high-temperature gas A1. Hence, in the pressure determining step S4, after the controller 40 has received the displacement-related signal from the non-contact displacement sensor 30, the controller 40 corrects the signal in the controller 40 by a temperature-displacement correction data base which has preloaded in, so as to control the gas regulation module 50. The temperature-displacement correction data base is obtained by an experiment in which the relation between temperature and thermal deformation of the metal diaphragm 20 is build.

Then, the controller 40 controls the flow passing through the needle valve 52. The reference pressure gas supply source 51 supplies the reference pressure gas A2 at a stable flow rate. The vacuum pump 53 provides a constant back pressure. Hence, the net flow rates of the reference pressure gas A2 which enters and exits the pressure referring room 12 is regulated to thereby adjust the gas pressure inside the pressure referring room 12. By adjusting the gas pressure inside the pressure referring room 12, it is feasible to not only restore the metal diaphragm 20 to its balance position but also equalize the adjusted gas pressure inside the pressure referring room 12 and the gas pressure inside the pressure measuring room 11, thereby evaluating the gas pressure inside the pressure measuring room 11. The reference pressure gas supply source 51 supplied the gas continuously and steadily, and the reference pressure gas A2 in the pressure referring room 12 is corrected from thermal expansion and contraction effect.

Referring to FIG. 1, the pressure referring room 12 has therein a swirl-reducing baffle 60 for reducing influence on the metal diaphragm 20 by the gas A2 flowing in the pressure referring room 12, suppressing high-temperature heat dissipation, reducing the difference in temperature between the pressure measuring room 11 and the pressure referring room 12 which are separated by the metal diaphragm 20, facilitating the correction of the temperature-dependent deformation-induced displacement of the metal diaphragm 20, and enhancing the precision in gas pressure measurement. The pressure referring room 12 is connected to a normal pressure gauge 70 which measures and displays the gas pressure level in the pressure referring room 12.

Hence, the present invention provides a high-temperature gas measuring method by measuring indirectly the displacement of a metal diaphragm between the two rooms in a pressure measuring gas housing, as the displacement of the metal diaphragm is caused by the difference in gas pressure and temperature between the two rooms, so as to measure the pressure of a high-temperature and/or corrosive gas, thereby dispensing with a corrosion-resistant heat-resistant pressure sensing component and cutting the costs incurred by measurement equipment.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A high-temperature gas pressure measuring method, the method comprising:
   a pressure measuring gas housing dividing step for dividing a pressure measuring gas housing into a pressure measuring room and a pressure referring room by a metal diaphragm;
   a gas introducing step for introducing the high temperature gas into the pressure measuring room and introducing a reference pressure gas into the pressure referring room;
   a displacement measuring step for measuring a displacement of the metal diaphragm with a non-contact displacement sensor disposed in the pressure referring room, converting the displacement into an electrical signal, sending the signal, wherein the displacement occurs because of a difference in gas pressure between the pressure measuring room and the pressure referring room; and
   a pressure determining step for adjusting the gas pressure in the pressure referring room with a gas regulation module connected to the pressure referring room and controlled by a controller according to the displacement to equalize the adjusted gas pressure in the pressure referring room with the gas pressure in the pressure measuring room and measuring the adjusted gas pressure in the pressure referring room.

2. The high-temperature gas pressure measuring method of claim 1, wherein the gas regulation module comprises:
   a reference pressure gas supply source for supplying the reference pressure gas to the pressure referring room;
   a vacuum pump for providing a back pressure; and
   a needle valve having an end connected to the pressure referring room and another end connected to the vacuum pump and the flow rate passing through is adjustable with the controller.

3. The high-temperature gas pressure measuring method of claim 2, wherein, in the pressure determining step, the reference pressure gas supply source supplies the reference pressure gas continuously and steadily in a manner to free the reference pressure gas from thermal expansion and contraction.

4. The high-temperature gas pressure measuring method of claim 2, wherein, in the pressure determining step, the controller corrects the displacement signal by a preloaded temperature-displacement correction data base to thereby adjust the flow rate passing through the needle valve and change a net gas flow rate of the pressure referring room.

5. The high-temperature gas pressure measuring method of claim 1, wherein the high temperature gas operates at 350° C. through 680° C.

6. The high-temperature gas pressure measuring method of claim 1, wherein the reference pressure gas is one of an inert gas, nitrogen gas, and dry air.

7. The high-temperature gas pressure measuring method of claim 1, wherein the pressure referring room further has therein a swirl-reducing baffle for reducing influence on the metal diaphragm by the gas flowing in the pressure referring room.

8. The high-temperature gas pressure measuring method of claim 1, wherein the metal diaphragm is made of a corrosion-resistant heat-resistant material, thin, and having ripple shape.

9. The high-temperature gas pressure measuring method of claim 8, wherein the high temperature gas is corrosive.

* * * * *